(12) United States Patent
Kim et al.

(10) Patent No.: US 11,392,725 B2
(45) Date of Patent: Jul. 19, 2022

(54) SECURITY PROCESSOR PERFORMING REMAINDER CALCULATION BY USING RANDOM NUMBER AND OPERATING METHOD OF THE SECURITY PROCESSOR

(71) Applicant: SAMSUNG ELECTRONICS CO., LTD., Suwon-si (KR)

(72) Inventors: Jae-hyeok Kim, Seoul (KR); Jong-hoon Shin, Hwaseong-si (KR); Ji-su Kang, Seoul (KR); Hyun-il Kim, Seongnam-si (KR); Hye-soo Lee, Yongin-si (KR); Hong-mook Choi, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 16/536,796

(22) Filed: Aug. 9, 2019

(65) Prior Publication Data
US 2020/0226294 A1 Jul. 16, 2020

(30) Foreign Application Priority Data

Jan. 16, 2019 (KR) .................. 10-2019-0005855

(51) Int. Cl.
*G06F 21/75* (2013.01)
*G06F 7/58* (2006.01)
(Continued)

(52) U.S. Cl.
CPC ........... *G06F 21/755* (2017.08); *G06F 7/544* (2013.01); *G06F 7/588* (2013.01); *G06F 7/722* (2013.01)

(58) Field of Classification Search
CPC ................................ G06F 7/722; G06F 21/755
See application file for complete search history.

(56) References Cited

U.S. PATENT DOCUMENTS 6,571,268 B1 *  5/2003  Giacalone ................. G06F 5/01
                                                708/524
8,402,287 B2    3/2013  Vigilant et al.
(Continued)

FOREIGN PATENT DOCUMENTS

KR    10-2013-0054591    5/2013
KR    10-1553148          9/2015
(Continued)

OTHER PUBLICATIONS

Clavier et al. "Horizontal Correlation Analysis on Exponentiation", pp. 1-19. (Year: 2010).*

*Primary Examiner* — Chuong D Ngo
(74) *Attorney, Agent, or Firm* — F. Chau & Associates, LLC

(57) ABSTRACT

Provided are a security processor for performing a remainder operation by using a random number and an operating method of the security processor. The security processor includes a random number generator configured to generate a first random number; a modular calculator configured to generate a first random operand based on first data and the first random number and generate output data through a remainder operation on the first random operand, wherein a result value of the remainder operation on the first input data is identical to a result value of the remainder operation on the first random operand.

15 Claims, 9 Drawing Sheets

(51) Int. Cl.
*G06F 7/544* (2006.01)
*G06F 7/72* (2006.01)

(56) References Cited

U.S. PATENT DOCUMENTS

| | | | |
|---|---|---|---|
| 8,880,577 | B2 | 11/2014 | Woo et al. |
| 2009/0016523 | A1 | 1/2009 | Dupaquis et al. |
| 2011/0246789 | A1* | 10/2011 | Feix .................. G09C 1/00 |
| | | | 713/190 |
| 2012/0039462 | A1 | 2/2012 | Choi et al. |
| 2016/0373248 | A1 | 12/2016 | Audley |
| 2018/0152288 | A1 | 5/2018 | Kang et al. |
| 2018/0211065 | A1 | 7/2018 | Jaffe |

FOREIGN PATENT DOCUMENTS

| | | |
|---|---|---|
| KR | 10-2018-0059270 | 6/2018 |
| KR | 10-1891898 | 8/2018 |

\* cited by examiner

FIG. 8

| $b_{2i+1}$ | $b_{2i}$ | $b_{2i-1}$ (Ref bit) | Recoding value | $b'_{2i+1}$ (Next Ref bit) |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 2 | 0 |
| 1 | 0 | 0 | -2 | 1 |
| 1 | 0 | 1 | -1 | 1 |
| 1 | 1 | 0 | -1 | 1 |
| 1 | 1 | 1 | 0 | 1 |

FIG. 9

| Recoding Value | sel0 | sel1 | sel2 | sel3 |
|---|---|---|---|---|
| -2 | 1 | 0 | 1 | 0 |
| -1 | 1 | 0 | 0 | 1 |
| 0 | 0 | 0 | 0 | 0 |
| 1 | 0 | 1 | 0 | 1 |
| 2 | 0 | 1 | 1 | 0 |

US 11,392,725 B2

SECURITY PROCESSOR PERFORMING REMAINDER CALCULATION BY USING RANDOM NUMBER AND OPERATING METHOD OF THE SECURITY PROCESSOR

CROSS-REFERENCE TO RELATED APPLICATION

This application claims the benefit of Korean Patent Application No. 10-2019-0005855, filed on Jan. 16, 2019, in the Korean Intellectual Property Office, the disclosure of which is incorporated by reference herein in its entirety.

BACKGROUND

The inventive concept relates to a security processor, and more particularly, to a security processor capable of effectively protecting a computer system from a side channel attack (SCA) and an operating method of the security processor.

The security processor may perform a security algorithm such as a cryptographic operation by using information requiring security such as a secret key. External leakage of secret information based on the implementation of the cryptographic operation by the security processor may be referred to as a side channel, and an attack method using the side channel may be referred to as an SCA. A security processor may employ a countermeasure against an SCA to avoid compromising the cryptographic operation.

A template attack is an example of an SCA. In a template attack, an attacker may create a "template" using a device similar to the target of the attack. The attacker has access to an effectively unlimited number of inputs and attack actions on their copy of the target device. Thus, the attacker may create a model of how side channel information relates to secret information on the target device by recording the side channel information for a large number of inputs being processed on the copy of the device. For example, the attacker may create a model of how power measurements on the target device correspond to inputs when a cryptographic operation is performed.

Defense techniques against an SCA (including masking or hiding side channel information) may impact the performance of a security processor. For example, implementing defense techniques may cause an increase in the circuit area or average power consumption of the security processor. Furthermore, these defensive techniques may not provide adequate protection against certain SCAs such as template attacks and power analysis attacks,

SUMMARY

The inventive concept provides a security processor capable of effectively preventing a side channel attack (SCA) while minimizing an increase in power consumption or performance overhead, and an operation method of the security processor.

According to an aspect of the inventive concept, there is provided a security processor including: a random number generator configured to generate a first random number; and a modular calculator configured to generate a first random operand based on first input data and the first random number, and generate output data through a remainder operation on the first random operand, wherein a result value of the remainder operation on the first input data is identical to a result value of the remainder operation on the first random operand for any value of the first input data (that is, for any value of the first input data the security processor is configured to process).

According to another aspect of the inventive concept, there is provided a security processor including: a random number generator configured to generate a first random number; and a modular calculator configured to generate output data by multiplying a modulo by the first random number, and adding first input data to multiplication result to generate a first random operand, and then performing a remainder operation in which the first random operand is divided by the modulo.

According to another aspect of the inventive concept, there is provided an operating method of a security processor, the operating method including: generating a first random number; generating a first random operand based on a modulo, the first random number and first input data; and generating output data based on the first random operand, wherein a remainder of dividing the first random operand by the modulo is identical to a remainder of dividing the first input data by the modulo for any value of the first input data.

A method of encrypting or decrypting data is described. The method comprising generating a random number; multiplying the random number by a modulo; generating a random operand by adding a result of the multiplication to input data; generating output data by perforrriing a remainder operation on the random operand using the modulo; and performing a cryptographic operation (e.g., encrypting or decrypting data) based on the output data.

BRIEF DESCRIPTION OF THE DRAWINGS

Embodiments of the inventive concept will be more clearly understood from the following detailed description taken in conjunction with the accompanying drawings in which:

FIG. 8 is a table illustrating a recoding table according to an example embodiment;

FIG. 9 is a table illustrating a control signal table, according to an example embodiment;

DETAILED DESCRIPTION OF THE EMBODIMENTS

Figure 1:
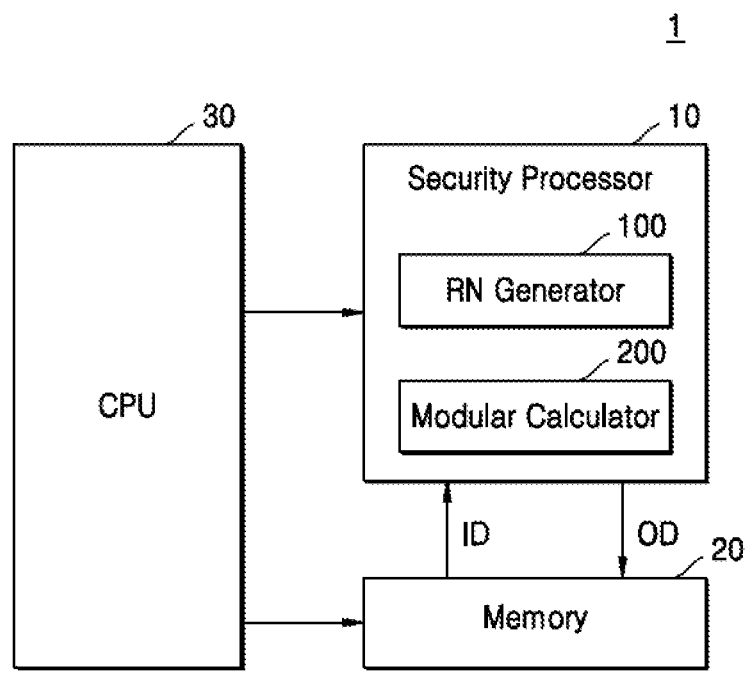
FIG. 1 is a block diagram illustrating an electronic system according to an example embodiment.

FIG. 1 is a block diagram illustrating an electronic system 1 according to an example embodiment.

Referring to FIG. 1, the electronic system 1 may include a security processor 10, a memory 20, and a central processing unit (CPU) 30. The electronic system 1 may correspond to various types of systems including, for example, a laptop computer, a mobile phone, a smart phone, a tablet personal computer (PC), a personal digital assistant (PDA), etc.

The CPU 30 may output various control signals for controlling the security processor 10 and the memory 20. In another embodiment, an application processor (AP) may perform a role of the CPU 30.

The memory 20 may store data under the control of the CPU 30 or the security processor 10. In an embodiment of the inventive concept, the memory 20 may record an input data ID received from an external source, provide the input data ID to the security processor 10 under the control of the CPU 30, receive output data OD from the security processor 10, where the output data OD is produced as a result of performing a security operation on the input data ID, and record the received output data OD.

The electronic system 1 may further include the security processor 10 (which may be separate from the CPU 30), capable of realizing fast arithmetic processing related to security operations, The security processor 10 may perform operations using secret information. The security processor 10 may be also referred to as a security calculator. In one embodiment, the security processor 10 may perform an encryption or decryption operation using a personal key, a private key, or both in a public key infrastructure (PKI).

The security processor 10 may perform various operations related to encryption or decryption operations. For example, the security processor 10 may perform an overall operation related to encrypting or decrypting data. Alternatively, the security processor 10 may perform only some among a number of operations related to the overall encryption or decryption operations.

According to embodiments of the inventive concept, data subjected to encryption or decryption operations of the secure processor 10 may be referred to as the input data ID, and data generated as a result of the encryption or decryption operations may be referred to as the output data OD. In one embodiment, the input data ID may represent a private key or a public key in a PKI and the output data OD may represent encrypted or decrypted data based at least in part on the private key, the public key, or both.

The encryption or decryption operations in the security processor 10 may include one or more multiplication operations. For example, when the security processor 10 performs a public key algorithm, the security processor 10 may perform arithmetic operations (addition, subtraction, multiplication, a remainder operation, a modular operation, etc.) on relatively large numbers, In some cases, an operation may be recognized as safe when the size of an operator is greater than some threshold (e.g., at least 1024 bits in the case of a Rivest Shamir Adleman (RSA) algorithm).

For an operation using a large operator, the security processor 10 may implement a digit-serial multiplier. As an example, Algorithm 1 for performing general serial multiplication is described as follows:

ALGORITHM 1

| Algorithm 1: Serial multiplication |
| --- |
| Inputs: Positive integers A and B, where $B = \Sigma_{i=0}^{n-1} b_i 2^i$, n is the operand size, and $b_i = 0$ or 1<br>Output: The result of the multiplication: $C \leftarrow A * B$ |

ALGORITHM 1-continued

| Algorithm 1: Serial multiplication |
| --- |
| 1. $C \leftarrow 0$<br>2. For i from n − 1 down to 0 do<br>  A. $T \leftarrow C * 2$<br>  B. $T \leftarrow T + b_i * A$<br>  C. $C \leftarrow T$<br>3. Return C |

As another example, algorithm 2 for performing digit-serial multiplication is described as follows:

ALGORITHM 2

| Algorithm 2: Digit-serial Multiplication |
| --- |
| Inputs: Positive integers A and B, where $B = \Sigma_{i=0}^{k-1} b_i 2^{di}$, n is the operand size, d is the digit size, $k = \lceil n/d \rceil$, and $b_i = [0,1,2,...,2^d - 1]$<br>Output: The result of the multiplication: $C \leftarrow A * B$<br>1. $C \leftarrow 0$<br>2. For i from k − 1 down to 0 do<br>  A. $T \leftarrow C * 2^d$<br>  B. $T \leftarrow T + b_i * A$<br>  C. $C \leftarrow T$<br>3. Return C |

Referring to the algorithms 1 and 2 described above, digit-serial multiplication is a special case of general serial multiplication that enables operation on several bits, $b_i$, of a multiplier, B, at one time, In performing multiplication operations as described above, the power consumed by the security processor 10 may be influenced by the operation value. Accordingly, when similar operations are frequently performed, an input data value (for example, A or B) may be identified using an SCA such as a template attack. Additionally or alternatively, secret information of the security processor 10, such as the secret key, may also be analyzed.

Hiding techniques and masking techniques may be employed as countermeasures to an SCA of this type. A hiding technique may refer to a method of reducing the change in the power consumption when processing different inputs by reducing the side channel signal (or by increasing noise). However, hiding techniques may result in an increase of the circuit area, the average power consumption, or both by a significant amount (e.g., an increase of more than two times). Additionally, if actual operations are performed only when a clock signal is in a certain state (for example, a low state), the overall performance may be degraded.

A masking technique may refer to randomizing the input by performing a masking operation ahead of the encryption operation. An unmasking operation may then be performed after the encryption operation to offset the masking operation (resulting in a mathematically equivalent operation). However, when the input data value (i.e., A or B) corresponds to "0" in the multiplication operation, the masking effect may be lost, and as a result, the risk of information leakage of the information from the security processor 10 may remain.

Thus, according to embodiments of the present disclosure, the security processor 10 may provide random characteristics to the input data ID that is a target of the SCA by changing the input data ID based on a random number. This may enable the security processor 10 to minimize the risk of leaking infOrmation during an SCA targeting the input data ID. That is, power consumption during operations on the actual input data ID may be randomly changed, and thus, vulnerability to the template attack may be eliminated or reduced.

To this end, the security processor 10 may include a random number generator 100 and a modular calculator 200. The random number generator 100 may generate a random number. For example, the random number generator 100 may generate a random number based on an entropy signal that is generated by motion of a user, thermal noise of a resistor, short noise of the p-n junction of a semiconductor, short noise of photon generation, generation wave of radiation, etc. In another example, the random number generator 100 may generate a random number based on an entropy signal that varies stochastically in a meta-stable state.

The modular calculator 200 may generate a random operand based on the input data ID received from the memory 20 and a random number received from the random number generator 100, and may output the output data OD by performing a remainder operation on the random operand. The remainder operation may be an operation that outputs a remainder obtained by dividing a dividend by a divisor, and may also be referred to as a modular operation.

Thus, the electronic system 1 may perform a cryptographic operation by generating a random number using the random number generator 100; multiplying the random number by a modulo, generating a random operand by adding a result of the multiplication to input data ID, and generating output data OD by performing a remainder operation on the random operand using the modulo at modular calculator 200; and performing a cryptographic operation based on the output data OD.

According to the technical idea of the inventive concept, the modular calculator 200 may perform the remainder operation on the random operand generated based on the random number and the input data ID, which may be different from the input data ID itself. Due to characteristics of the random operand that change according to the random number, the security processor 10 may have strong immunity to an SCA. For example, using the random operand may obscure a relationship between the input data ID and leaked information from the security processor 10 such as power usage information.

Figure 2:
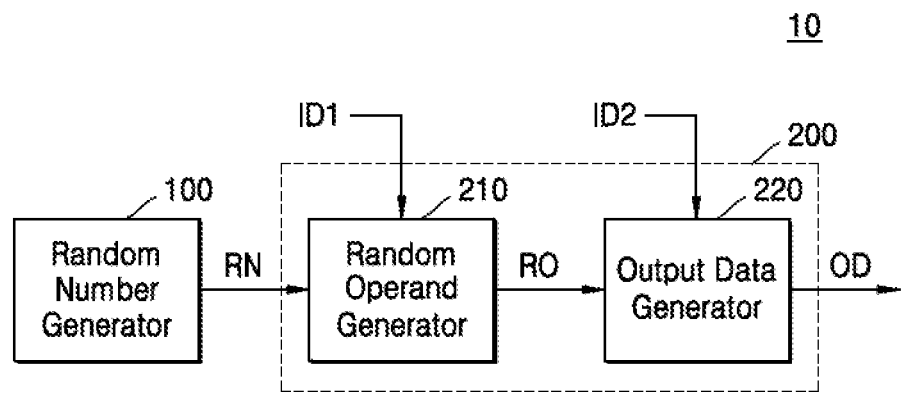
FIG. 2 is a block diagram illustrating a security processor according to an example embodiment.

FIG. 2 is a block diagram illustrating the security processor 10 according to an example embodiment. Descriptions previously given with reference to FIG. 1 are omitted.

Referring to FIG. 2, the security processor 10 may include the random number generator 100 and the modular calculator 200, and the modular calculator 200 may include a random operand generator 210 and an output data generator 220.

The random operand generator 210 may receive a random number RN from the random number generator 100 and receive first input data ID1 from the memory (20 in FIG. 1). The random operand generator 210 may generate a random operand RO based on the random number RN and the first input data ID1. In an embodiment, the random operand generator 210 may generate the random operand RO by inputting the random nuniber RN and the first input data ID1 into a certain formula. In an example, the random operand generator 210 may generate the random operand RO by multiplying a modulo M to the random number RN and then generating the random operand RO by adding a result thereof to the first input data ID1 (where RO=ID1+RN*M). The modulo M may be a divisor of the remainder operation that is performed by the output data generator 220 to generate the output data OD.

The output data generator 220 may receive the random operand RO from the random operand generator 210 and receive second input data ID2 from the memory (20 in FIG. 1). The output data generator 220 may perform arithmetic operations (for example, addition, subtraction, multiplication, and division) on the random operand RO and the second input data ID2 and may generate the output data OD by performing the remainder operation using the modulo M as the divisor.

According to the nature of the remainder operation (mod), Formula 1 and Formula 2 below may be satisfied for arbitrary numbers such as A, B, r, and the modulo M, and an arbitrary arithmetic operation A (for example, any one of addition, subtraction, multiplication, and division).

$$A \bmod M = (A + rM) \bmod M \qquad \text{[Formula 1]}$$

$$(A \Delta B) \bmod M = \{(A + rM) \Delta B\} \bmod M \qquad \text{[Formula 2]}$$

Formula 3 and Formula 4 may be satisfied for the first input data ID1, the second input data IS2, and the random operand RO according to Formulas 1 and 2 above.

$$ID1 \bmod M = (ID1 + RN^*M) \bmod M = RO \bmod M \qquad \text{[Formula 3]}$$

$$(ID1 \Delta ID2) \bmod M = \{(ID1 + RN^*M) \Delta ID2\} \bmod M = (RO \Delta ID2) \bmod M \qquad \text{[Formula 4]}$$

The security processor 10 according to the technical idea of the inventive concept may perform the remainder operation on the random operand RO based on the random number RN instead uf the first input data ID1. According to the nature of the remainder operation, a result of the remainder operation on the random operand. RO may be the same as a result of the remainder operation on the first input data ID1, and the security processor 10 may effectively reduce the risk of a SCA by performing the remainder operation on the random operand RO to which the random characteristic is added.

That is, the security processor 10 may mitigate the potential for side channel infOrmation to be leaked because the remainder operation operates on the randomized input, RO$\Delta$ID2, rather than the input itself (i.e., ID1$\Delta$ID2). However, the operation itself and the output of the remainder operation remain unchanged. Therefore, the security processor 10 may produce the desired output and reduce the risk of an SCA without substantially increasing the power usage or chip area.

Figure 3:
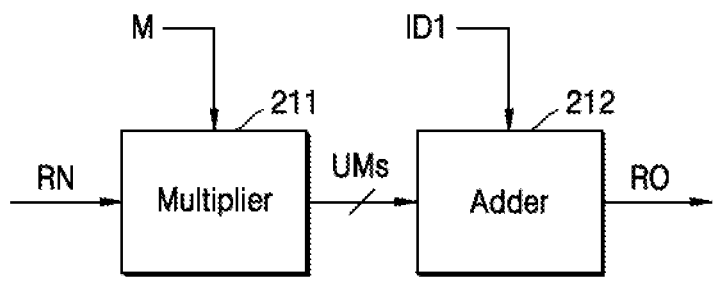
FIG. 3 is a block diagram illustrating a random operand generator according to an example embodiment.

FIG. 3 is a block diagram illustrating the random operand generator 210 according to an example embodiment.

Referring to FIG. 3, the random operand generator 210 may include a multiplier 211 and an adder 212. The multiplier 211 may receive the random number RN and the modulo M and may perform a multiplication on the random number RN and the modulo M. In an example, the multiplier 211 may receive the modulo M from a register inside the security processor (i.e., security processor 10 in FIG. 1).

In an embodiment, the multiplier 211 may divide the random number RN into a plurality of unit random numbers and may generate a plurality of unit modulos UM by multiplying the modulo M to each of the plurality of unit random numbers. The multiplier 211 may output the generated plurality of unit modulos UM to the adder 212.

The multiplier 211, according to an embodiment, may divide the random number RN into a plurality of unit random numbers of a small unit size (for example, 2 bits), may perform a plurality of partial multiplication operations that perform a multiplication operation on each of the plurality of unit random numbers and modulo M, and accordingly, may efficiently perform. the multiplication on a random number having a large number of bits and the modulo M. The adder 212 may generate the output data OD by adding the plurality of unit modules UM and the first input data ID1 according to the number of digits.

Figure 4:
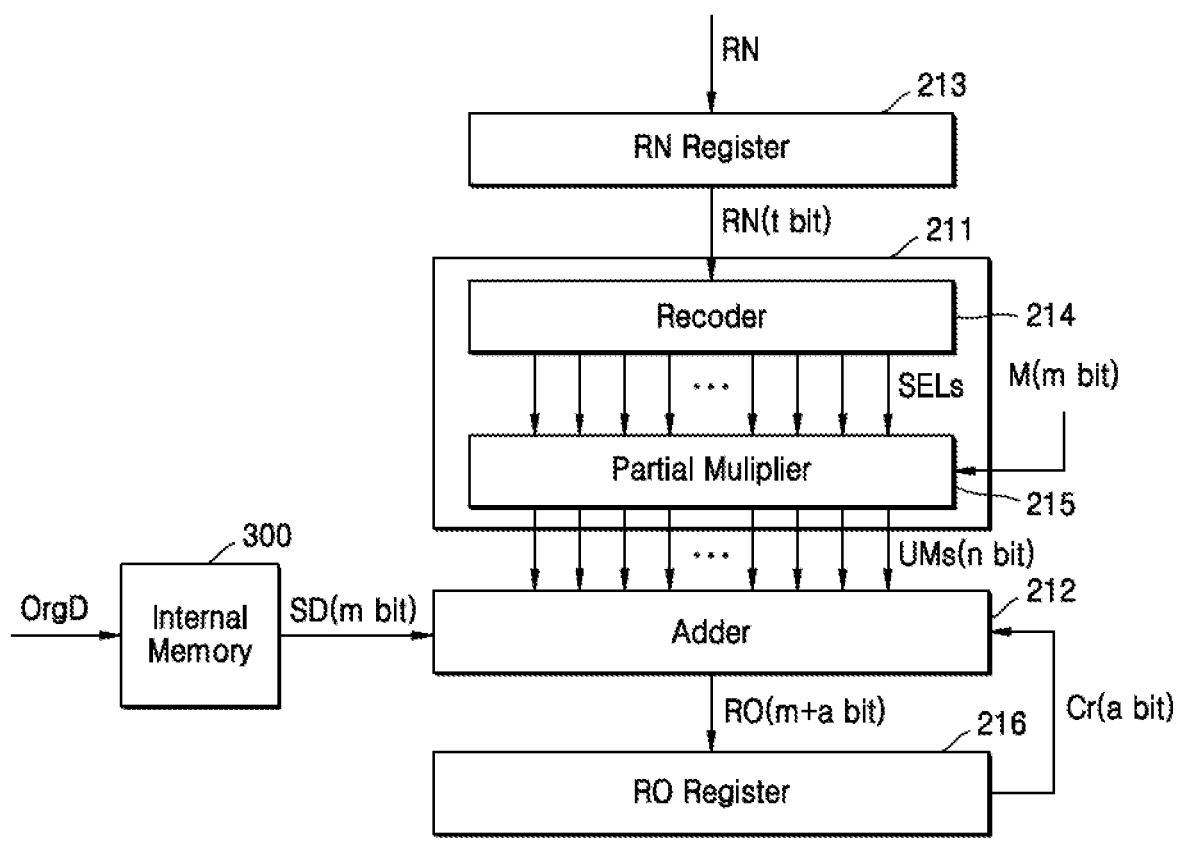
FIG. 4 is a block diagram illustrating a security processor according to an example embodiment.

FIG. 4 is a block diagram illustrating the security processor 10 according to an example embodiment.

Referring to FIG. 4. the security processor 10 may include a random number register 213, the multiplier 211, the adder 212, a random operand register 216, and an internal memory 300, and the multiplier 211 may include a recoder 214 and a partial multiplier 215.

The random number register 213 may receive the random number RN from the random number generator (100 in FIG. 1) and output a random number RN of a certain number of bits (for example, t bits) to the multiplier 211.

The recoder 214 may receive the random number RN and perform a recoding operation on the received random number RN. In an example, the recoding operation may correspond to a Booth recoding operation that is suitable for logic elements for implementing the digit serial algorithm for the random number RN and the modulo M.

A plurality of partial multiplication operations may be performed as part of multiplying the random number RN times the modulo M, and one recoding operation corresponding to each partial multiplication operation may be performed. The recoding operation may include replacing a value of a random number with a different value that is mathematically equivalent to an original value to efficiently implement the multiplication. When the recoding operation is performed, the number of partial multiplication operations may be reduced. A typical recoding operation may include the Booth recoding operation.

In one embodiment, the recoder 214 may include a recoding table in which conversion information for converting each of the plurality of unit random numbers RN into a plurality of recoding values is stored and may generate the plurality of recoding values from each of the plurality of unit random numbers based on the recoding table. The recoding table is described below in detail with reference to FIG. 7.

In an embodiment, the recoder 214 may include a control signal table in which corresponding information about a plurality of control signals SEL corresponding to each of the plurality of recoding values is stored and may output to the partial multiplier 215 the plurality of control signals SEL for each of the plurality of recoding values based on the control signal table. The control signal table is described below in detail with reference to FIG. 8.

The partial multiplier 215 may receive a modulo M of m bits and the plurality of control signals SEL and generate a plurality of unit modulos UM based on the plurality of control signals SEL. The plurality of unit modulos UMs may correspond to a value obtained by multiplying a plurality of unit random numbers by the modulo M, respectively.

The internal memory 300 may store original data OrgD received from outside of the security processor 10 (for example, from the memory 20 in FIG. 1) and may output to the adder 212 separation data SD in which the original data OrgD is separated in units of m bits. To this end, the internal memory 300 may be implemented as at least one storage device and may include, for example, at least one of a volatile memory and a nonvolatile memory, The nonvolatile memory may include a flash memory, random-access memory (RAM), phase-change RAM (PRAM), magnetic RAM (MRAM), resistive RAM (RRAM), ferroelectric RAM (FRAM), etc., and the volatile memory may include dynamic RAM (DRAM), static RAM (SRAM), synchronous DRAM (SDRAM), a latch, a flip-flop, a register, etc.

The adder 212 may receive the plurality of unit modulos and the separation data SD and further receive a roundup value Cr from the random operand register 216. The roundup value Cr may denote data corresponding to a portion exceeding m bits which is the bit number of the separation data SD in a calculation for the previous separation data SD. The adder 212 may generate a random operand RO of (m+a) bits by adding the plurality of unit modulos UM, the separation data SD, and the roundup value Cr according to the number of digits. The adder 212 may store the generated random operand RO in the random operand register 216.

The random operand register 216 may store the random operand RO, and when operations on all the original data OrgD are completed, may output the stored random operand RO. In FIG. 4, the random operand register 216, the random number register 213, and the internal memory 300 are illustrated as being separate from each other. However, the embodiment is not limited thereto. A configuration of two or more of the random operand register 216, the random number register 213, and the internal memory 300 may be implemented as a single memory element. In addition, in FIG. 4, an example is illustrated in which the adder 212 receives the separation data SD from the internal memory 300. However, this is only an example, and the adder 212 may receive the separation data SD from a memory (for example, 20 in FIG. 1) outside the security processor 10.

Figure 5:
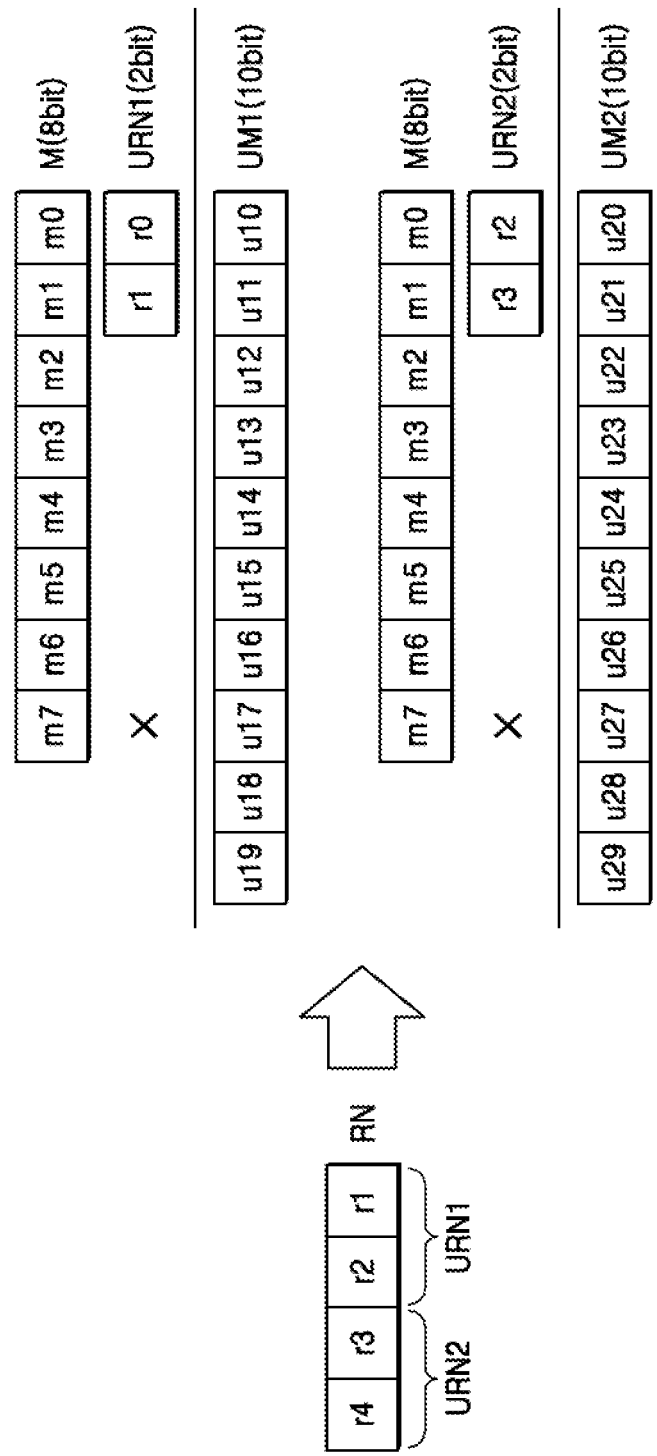
FIGS. 5 and 6 are diagrams illustrating operations of an arithmetic processor according to example embodiments.
Figure 6:
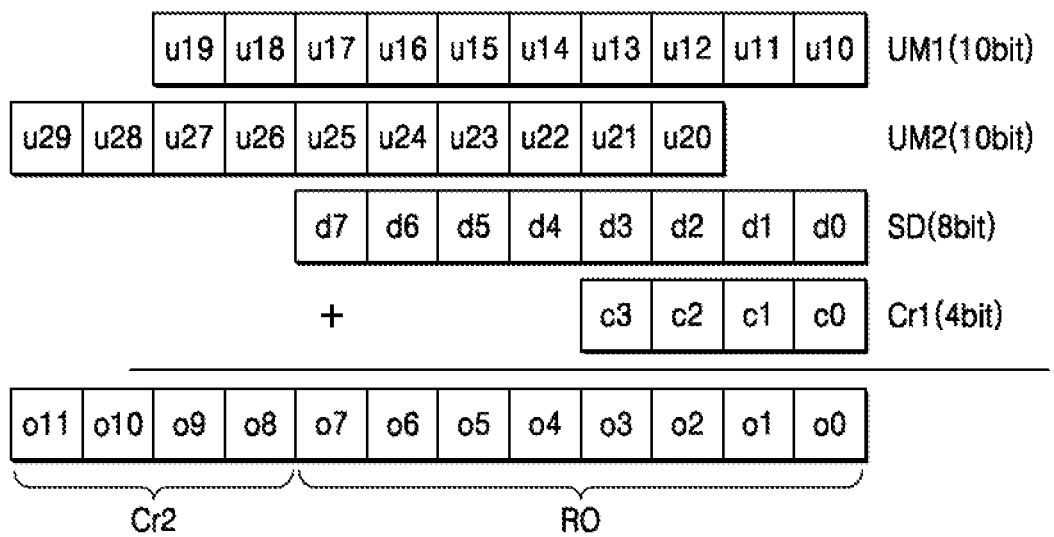

FIGS. 5 and 6 are diagrams illustrating operations of an arithmetic processor, respectively, according to example embodiments.

Referring to FIGS. 4 and 5, the multiplier 221 may receive a random number RN (for example, of 4 bits) and divide the random number RN into a first unit random number URN1 and a second unit random number URN2, each of which is in units of two bits. The multiplier 221 may generate a first unit modulo UM1 of 10 bits by multiplying the first unit random number URN1 by the modulo M of 8 bits. The multiplier 221 may generate a second unit modulo UM1 of 10 bits by multiplying the second unit random number URN2 by the modulo M (for example, a modulo having 8 bits).

According to an embodiment of the inventive concept, the multiplier 221 may calculate a plurality of recoding values for the random number RN based on the recoding table and may multiply the modulo M by the first and second unit random numbers by using the plurality of control signals corresponding to each of the plurality of recoding values based on the control signal table. This is described below in detail with reference to FIGS. 7 through 10.

FIG. 5 illustrates an embodiment in which both the first unit modulo UM1, and the second unit modulo UM2 are of 10 bits, but the inventive concept is not limited thereto. The numbers of bits of the first and second unit modulus UM1 and UM2 may be greater than or less than 10 bits, depending on a result of multiplying the first and second unit random numbers URN1 and URN2 by the modulo M.

Referring to FIGS. 4 and 6, the adder 212 may receive the first unit modulo UM1 and the second unit modulo UM2 from the multiplier 221, receive the separation data SD from the internal memory 300, and receive a first roundup value Cr1 from the random operand register 216. The adder 212 may add the first unit module UM1, the second unit module UM2, the separation data SD, and the first roundup value Cr1 according to the number of digits. In an example, the second unit modulo UM2 is a value obtained by multiplying the second unit random number URN2, in which the position of the digits is greater than the first unit random number URN1 by two bits, by the modulo M. Thus, to obtain the desired total number of digits, the addition may be performed b offsetting the second unit random number URN2 by two bits.

As a result of the addition, the adder 212 may generate data of 12 bits. First through eighth bits o0 through o7 (i.e., the 8 bits corresponding to the separation data SD) among the generated data may be stored as the calculation-completed random operand RO in the random operand register 216. Ninth through twelfth bits o8 through o11 may be utilized as a second roundup value Cr2 in an addition operation on the next separation data SD.

Figure 7:
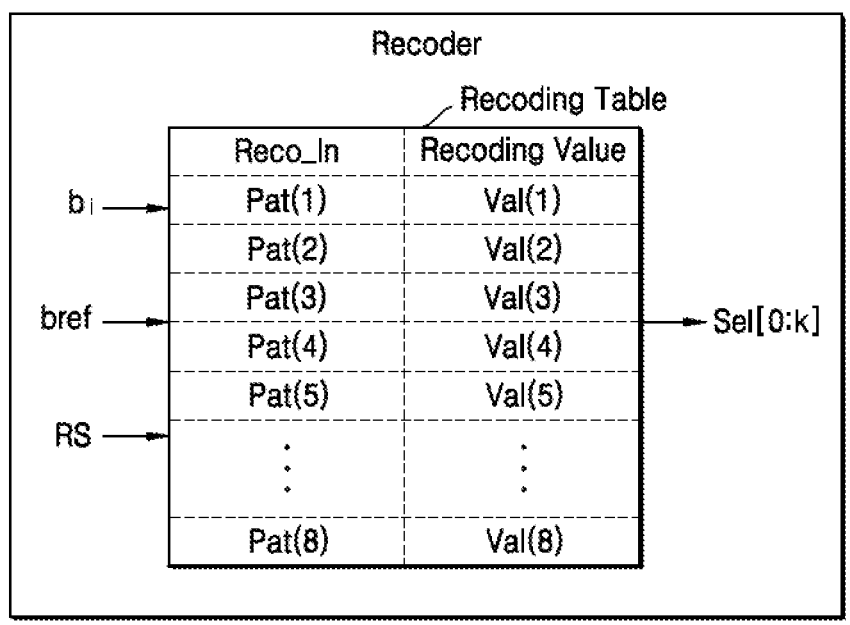
FIG. 7 is a diagram illustrating a recoder according to an example embodiment.

FIG. 7 is a diagram illustrating a recoder according to an example embodiment.

Referring to FIGS. 4 and 7, the recoder may include a recoding table for storing conversion information between recoder inputs and recoding values. The conversion information may include a plurality of recoding values respectively corresponding to a plurality of patterns of recoder inputs. The recoder input Reco_In may include a bit $b_i$ of a unit random number and a reference bit bref The recoder input Reco_In may have a form corresponding to one of a variety of patterns according to the bits ($b_i$ and bref). For example, the recoder input Reco_In may correspond to any one of first through eighth patterns Pat(1) through Pat(8). In one example, bi of the unit random number comprises 2 bits and the reference bit bref, is 1 bit.

According to the conversion information stored in the recoding table, the recoder input Reco_In may be mapped or converted into a recoding value corresponding thereto. In an example, a first recoding value Val(1) corresponding to a recoder input Reco_In having a first pattern Pat(1) is stored in the conversion information. In this example, when the bit $b_i$ of the unit random number and the reference bit bref have the first pattern Pat(1), the recoder may output the first recoded value Val(1).

Additionally or alternatively, the recoding value may be generated based on the conversion operation above, and the recoding value may be output in the form of a control signal sel[0:k]. In an example, when the random number has two bits, the control signal sel[0:k] may comprise four bits.

According to an embodiment of the inventive concept, when the Booth recoding method described above is applied, the recoding output may take on values from the set $\{-2, -1, 0, 1, 2\}$. Accordingly, the recoding value corresponding to the recoder input having any one pattern may be the same as the recoding value corresponding to the recoder input having another pattern. That is, multiple recoder input patterns may be mapped to the same recoding values.

In addition, based on the control signal sel[0:k], the partial multiplier 215 may generate a result in which the random number RN is multiplied by any one of the values of $\{-2, -1, 0, 1, 2\}$ (for example, partial multiplication coefficients) in the partial multiplication operation. Accordingly, in one partial multiplication operation, the partial multiplier 215 may receive the modulo M and the control signal sel[0:k] as inputs and generate any one of values of $\{-2M, -M, 0, M, 2M\}$ through the partial multiplication operation process.

FIG. 8 is a table illustrating a recoding table according to an example embodiment.

Referring to FIG. 8, when the random number RN is "01101001" as an 8-bit value, the random number RN may be converted, as illustrated in Formula 5, such that coefficients have values of $\{-2, -1, 0, 1, 2\}$.

$RN = 01101001_{(2)}$ $= 0 \cdot 2^7 + 1 \cdot 2^6 + 1 \cdot 2^5 + 0 \cdot 2^4 + 1 \cdot 2^3 + 0 \cdot 2^2 + 0 \cdot 2^1 \cdot 1 \cdot 2^0$ $$= 2 \cdot 2^6 - 1 \cdot 2^4 - 2 \cdot +1 \cdot 2^0 \qquad (1)$$

$$= 1 \cdot 2^6 + 2 \cdot 2^4 + 2 \cdot 2^2 + 1 \cdot 2^0 \qquad (2)$$

That is, the random number RN may be converted into (1), $2 \cdot 2^6 - 1 \cdot 2^4 - 2 \cdot 2^2 + 1 \cdot 2^0$, and (2), $1 \cdot 2^6 + 2 \cdot 2^4 + 2 \cdot 2^2 + 1 \cdot 2^0$. Both of the conversion values described above may have a value of 105, which is the same as the original random number RN, According to the conversion example above, two bits of a unit random number URN may be converted into any one of the values of $\{-2, -1, 0, 1, 2\}$. Thus, a random number RN of 8 bits may be categorized into four unit random numbers each having two bits. For example, the two least significant bits may be categorized as the first unit random number, the next two lower bits may be categorized as the second unit random number, the next two lower bits may be categorized as a third unit random number, and two most significant bits may be categorized as a fourth unit random number.

In addition, when it is assumed that the recoding operation is performed first from. the lower bits of the random number RN, an upper bit of the unit random number at which the current recoding operation is performed may be used as a reference bit in the next recoding operation. For example, When the recoding operation is performed on the second unit random number, an upper bit of the two bits of the first unit random number may correspond to the reference bit Ref bit.

In the case where the recoding operation is performed on the first unit random. number including the two least significant bits, a bit corresponding to "0" may be defined as the reference bit Ref bit. Accordingly, assuming that two bits for which the current recoding operation is performed are $b_{2i\ 1}$ and $b_{2i}$, the reference bit Ref bit in the current recoding operation may correspond to $b_{2i-1}$, and a reference bit in the next recoding operation Next Ref bit may correspond to $b_{2i+1}$.

In an example where the random number RN is "$01101001_{(2)}$,", the first unit random number may be "01" (from the first and second bits), and the reference bit may be "0". As illustrated in the recoding table of FIG. 8, the recoder input including the bits of the first unit random number and the reference bit Ref bit may correspond to "010", and the recoding value Recoding Value corresponding thereto may have a value of "1".

The second unit random number including the next two lower bits may be "10" (from the third and fourth bits), and the reference bit Ref bit may be "0", from the upper bit of the previous first unit random number. Accordingly, the recoder input including the bits of the second unit random number and the reference bit Ref bit may correspond to "100", and the recoding value Recoding Value corresponding thereto may have a value of "−2".

The third unit random number including the next two lower bits may be also "10" (from the fifth and sixth bits), and the reference bit Ref bit may be "1", from the upper bit of the previous second unit random number. Accordingly, the recoder input including the bits of the third unit random number and the reference bit Ref bit may correspond to "101", and the recoding value Recoding Value corresponding thereto may have a value of "−1".

The fourth unit random number including the next two lower bits may be "01" (from the seventh and eighth bits), and the reference bit Ref bit may be "1", from the upper bit of the previous third unit random number. Accordingly, the recoder input including the bits of the fourth random number and the reference bit Ref bit may correspond to "011", and the recoding value Recoding Value corresponding thereto may have a value of "2".

In other words, the recoder may receive "01101001$_{(2y)}$," as the random number RN and generate "2", "−1", "−2", and "1" as the recoding values Recoding Value.

In some examples, the recoding table is generated in advance and stored in a security processor, but the embodiment is not limited thereto. In an example, a recoding value corresponding to a recoder input illustrated in the recoding table may be obtained by calculating a certain formula, and a configuration for calculating the certain formula may be provided in the security processor to generate a recoding value through an operation process.

FIG. 9 is a table illustrating a control signal table according to an example embodiment.

Referring to FIGS. 8 and 9, when the recoding value illustrated in the control signal table of FIG. 9 corresponds to "−2", first through fourth control signals sel0 through sel3 may have values of "1010", and when the recoding value corresponds to "−1", the first through fourth control signals sel0 through sel3 corresponding thereto may have values of "1001", in addition, when the recoding value corresponds to '0', the first through fourth control signals sel0 through sel3 may have values of '0000'. When the recoding value corresponds to '1', the first through fourth control signals sel0 through sel3 may have values of '0101'. When the recoding value corresponds to '2', the first through fourth control signals sel0 through sel3 may have values of '0110'. The first through fourth control signals sel0 through sel3 described above may be used as signals for selecting coefficients that are multiplied to the modulo in the partial multiplication operation described below.

The recoder, according to an embodiment of the inventive concept, may provide the partial multiplier the first through fourth control signals sel0 through sel3 corresponding to the recoding values (e.g., "2", "−1", "−2", and "1") described with reference to FIG, 8. In an example, the recoder may output "0101" as the first through fourth control signals sel0 through sel3 to the partial multiplier based on "1" (i.e., the recoding value corresponding to the first unit random number). The recoder may output "1010" as the first through fourth control signals sel0 through sel3 to the partial multiplier based on "−2"(i.e., the recoding value corresponding to the second unit random number).

Figure 10:
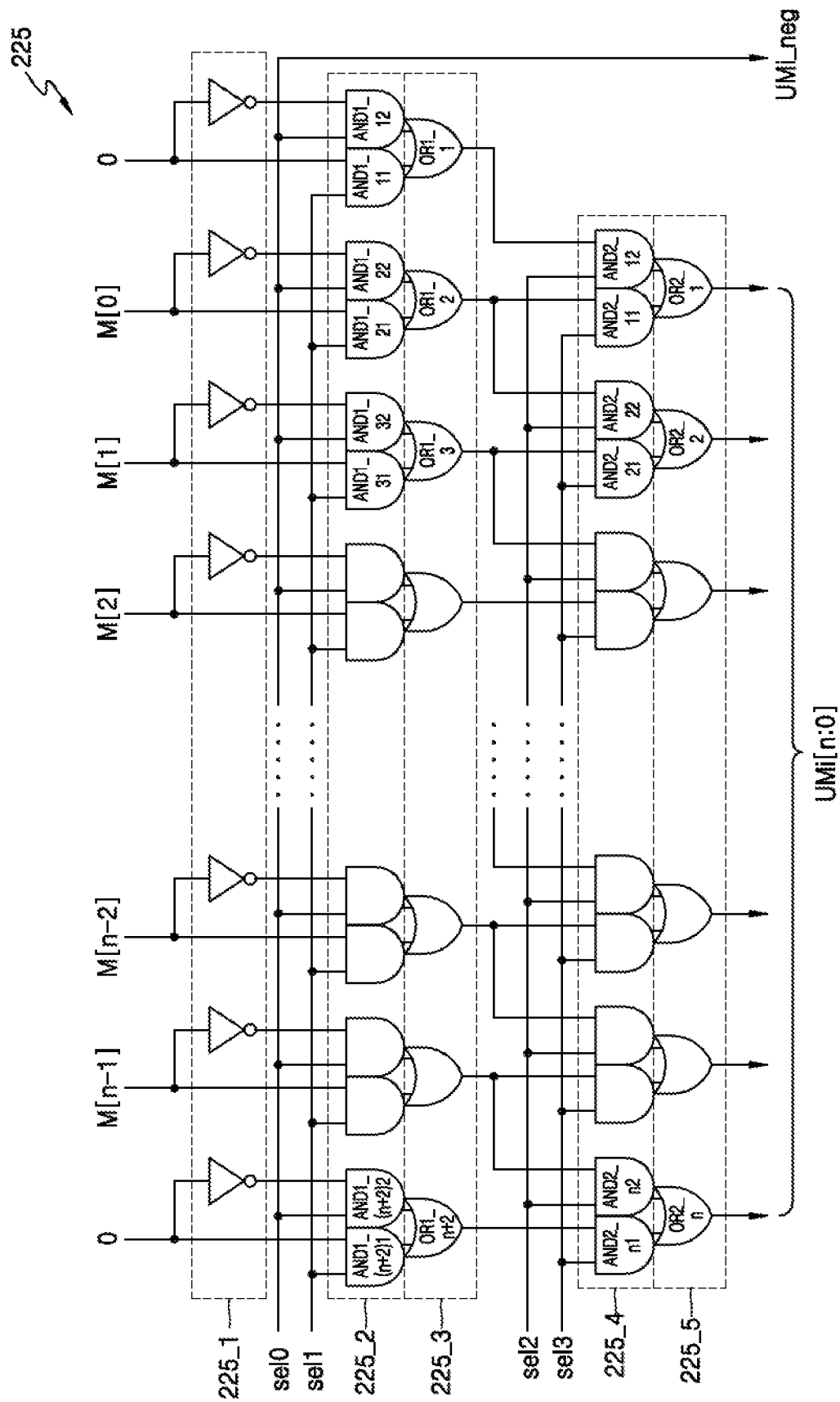
FIG. 10 is a circuit diagram illustrating a partial multiplier according to an embodiment.

FIG. 10 is a circuit diagram illustrating a partial multiplier 225 according to an embodiment.

Referring to FIG. 10, a modulo M of n bits (M[0] through M[n−1]) and the first through fourth control signals sel0 through sel3 according to a recoding result of the above-mentioned random number may be provided to the partial multiplier 225. Although logic elements constituting one partial multiplier 225 are illustrated in FIG. 10, two or more partial multiplications may be performed together. Accordingly, the security processor 10 may include two or more partial multipliers 225. The partial multiplier 225 may generate a unit modulo of (n+1) bits UMi[n:0] and sign data UMi_neg of 1 bit, as a multiplication result of the modulo M n bits (M[0] through M[n−1]) and the unit random number of 2 bits.

For the modulo M, a partial multiplication result value of the unit modulo of (n+1) bits UMi[n:0] and the sign data UMi_neg of 1 bit may be any one of {−2M, −M, 0, M, 2M}. The sign data UMi_neg of 1 bit may correspond to the first control signal sel0.

The partial multiplier 225 may be implemented using a plurality of logic elements. In FIG. 10, an example is illustrated in which the partial multiplier 225 includes a plurality of inverters 410, a plurality of AND gates, and a plurality of OR gates. For example, in addition to the modulo M of n bits (M[0] through M[n−1]), a zero value may be further input to the right of the least significant bit (i.e., M[0]) of the modulo M of n bits (M[0] through M[n−1]). Additionally, a zero value may be further input to the left of the most significant bit, or M[n−1], of modulo M of n bits (M[0] through M[n−1]).

The partial multiplier 225 may include multiple (e.g., n+2) inverters 225_1 corresponding to the modulo M of n bits (M[0] through M[n−1]) and the two zero values described above. In addition, a first stage of the partial multiplier 225 may further include a first AND gate block 225_2 and a first OR gate block 225_3 The first AND gate block 225_2 may include a plurality of AND gates (AND1_11, AND1_12 through AND1_(n+2)1, AND1(n+2) 2). As an example, two AND gates may be arranged corresponding to each bit of the modulo M of n bits (M[0] through M[n−1]) and each of the two zero values. Taking the least significant bit M[0] of the modulo M of n bits (M[0] through M[n−1]) as an example, a first AND gate AND1_21 may receive the second selection signal sel1 and the least significant bit M[0] as inputs, and a second AND gate AND1_22 may receive the first select signal selO and an inverted value of the least significant bit M[0] as inputs.

In addition, the first OR gate block 225_3 may include first through (n+2$\_^{th}$ OR gates OR1_1 through OR1_(n+2). Taking the least significant bit M[0] of the modulo M of n bits (M[0] through M[n−1]) as an example, outputs of the first AND gate AND_21 and the second AND gate AND1_22 may be provided as inputs to the second OR gate OR1_2.

A second stage of the partial multiplier 225 may further include a second AND gate block 225_4 and a second OR gate block 225_5. As an example, the second AND gate block 225_4 may include a plurality of AND gates (AND2_11, AND2_12 through AND2_n1, AND2_n2). Taking the two least significant bits M[0] and M[1] of the modulo M of n bits (M[0] through M[n−1]) as an example, a first AND gate AND2_21 may receive outputs of the fourth selection signal sel3 and the third OR gate OR1_3 of the first OR gate block 225_3, and a second AND gate AND2_22 may receive outputs of the third selection signal sel2 and the second OR gate OR12 of the first OR gate block 225_3.

The second OR gate block 225_5 may include first through n$^{th}$ OR gates OR2_1 through OR2_n. Taking the least significant bit M[0] of the modulo M of n bits (M[0] through M[n−1] as an example, outputs of the first AND gate AND2_21 and the second AND gate AND2_22 may be provided as inputs to the second OR gate OR2_2. A detailed connection relation for other logic elements included in the partial multiplier 225 may be implemented as illustrated in the drawings, and thus a detailed description thereof is omitted.

In the logic elements illustrated in FIG. 10, the above-described recoding result may be implemented together with the partial multiplication operation via the first through fourth control signals sel0 through sel3. For example, the first and second control signals sel0 and sel1 may determine positive/negative signs, and the third and fourth control signals sel2 and sel3 may determine that the coefficients of the partial multiplication correspond to "1" or "2".

When the partial multiplication result is negative, the sign data UMi_neg may be used to generate a complement of 2. For example, −2M may be calculated as −2M=~(M<<1)+1. In this equation, (M<<1.) may correspond to multiplying by 2, and a negation ("~") and "+1" may be used to generate a complement of 2.

A partial multiplier according to an embodiment of the inventive concept may generate unit modulos (UMi[n:0]) and UMi_neg that correspond to a value obtained by multiplying a unit random number by a modulo M based on the first through fourth control signals sel0 through sel3, and may output the generated unit modulos (tiMi[n:0] and UMi_neg) to an adder (e.g., adder 212 of FIG. 3).

Figure 11:
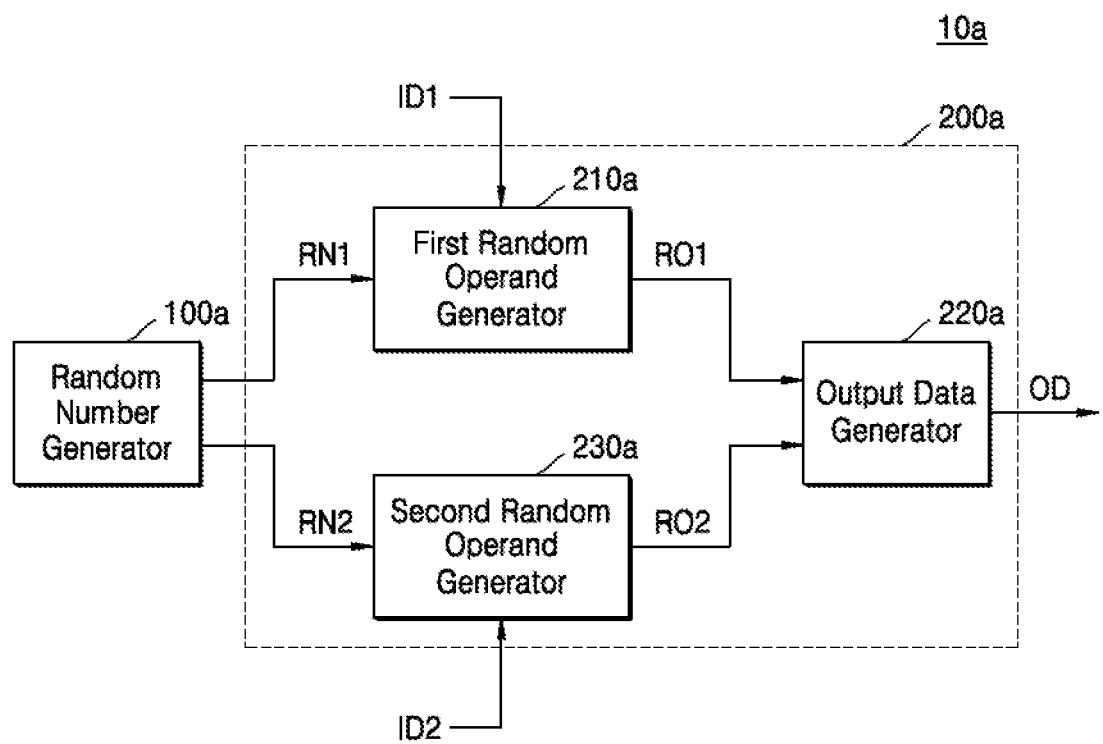
FIG. 11 is a block diagram illustrating a security processor according to an example embodiment.

FIG. 11 is a block diagram illustrating a security processor 10a according to an example embodiment. The security processor 10a may be similar to the security processor 10 described with reference to FIG. 2, but may include multiple random operand generators. Descriptions previously given with reference to FIG. 2 are omitted.

Referring to FIG. 11, the security processor 10a may include a random number generator 100a and a modular calculator 200a, The modular calculator 200a may include a first random operand generator 210a, a second random operand generator 230a, and an output data generator 220a.

The first random operand generator 210a may receive the first random number RN1 from the random number generator 100a and receive first input data ID1 from a memory (20 in FIG. 1). The random operand generator 210a may generate a first random operand RO1 and a second random operand RO2 based on the first random number RN1 and the first input data ID1, in an example, the first random operand generator 210a may generate the first random operand ROI by multiplying the modulo M by the first random number RN1 and then, adding the first input data ID1 (where RO1=ID1+RN1*M).

The second random operand generator 230a may receive the second random number RN2 from the random number generator 100a and receive the second input data ID2 from a memory (20 in FIG. 1). The second random operand generator 230a may generate a second random operand RO2 based on the second random number RN2 and the second input data ID2. In an example, the second random operand generator 230a may generate the second random operand RO2 by multiplying the modulo M by the second random number RN2 and then adding the second input data ID2 (where RO2=ID2+RN2*M)

The output data generator 220a may generate the output data OD by receiving the first random operand RO1 and the second random operand RO2, performing arithmetic operations (for example, addition, subtraction, multiplication, and division) on the first random operand ROI and the second random operand RO2, and performing remainder operations, in which the modulo M is used as a dividend, on a result of the arithmetic operations.

According to the nature of the remainder operation (mod), the following Formula 6 may be satisfied for arbitrary numbers such as A, B, r, and the modulo M, and an arbitrary arithmetic operation Δ (for example, any one of addition, subtraction, multiplication, and division).

$$(A \Delta B) \bmod M = \{(A+rM)\Delta(B+rM)\} \bmod M \quad \text{[Formula 6]}$$

Formula 7 for the first input data ED1, the second input data ED2, the first random operand RO1, and the second random operand RO2 are established based on Formula 6 above, $$(ID1 \Delta ID2) \bmod M = \{(ID1+RN1*M)\Delta(ID2+RN2*M)\} \bmod M = (RO1 \Delta RO2) \bmod M \quad \text{[Formula 7]}$$

In other words, the security processor 10a according to an embodiment of the inventive concept may perform the remainder operation on the first random operand RO1 that is calculated based on the first input data ID1 and the first random number RN1, and on the second random operand RO2 that is calculated based on the second input data ID2 and the second random number RN2. The security processor 10a may perform the remainder operation, similar to the case of the first input data ID1, on the second input data ID2 by using the second random operand RO2 generated by the second random number RN2. Thus, the security of the security processor 10a may be increased (e.g., by reducing the vulnerability of the security processor 10a to an SCA based on a power analysis).

Figure 12:
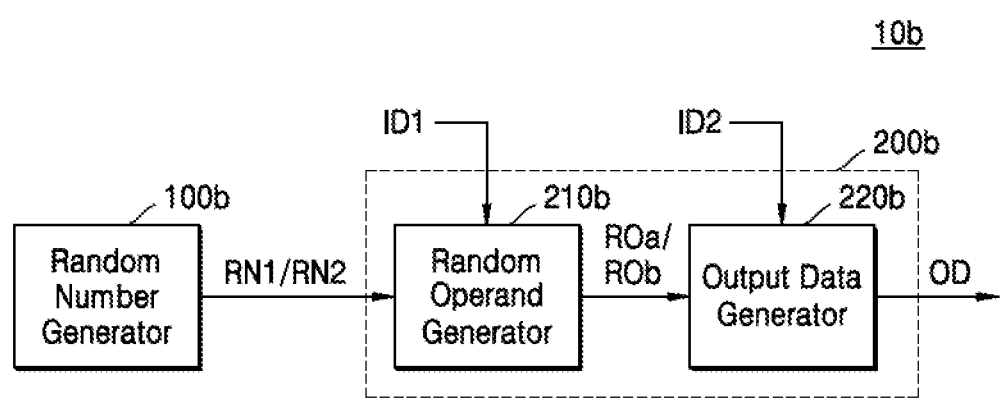
FIG. 12 is a block diagram illustrating a security processor according to an example embodiment.

FIG. 12 is a block diagram illustrating a security processor 10b according to an example embodiment. The security processor 10b may be similar to the security processor 10 described with reference to FIG. 2, but may produce multiple random numbers and random operands for each operation. Descriptions previously given with reference to FIG. 2 are omitted.

Referring to FIG. 12, the security processor 10b may include a random number generator 100b and a modular calculator 200b. The modular calculator 200b may include a random operand generator 210b and an output data generator 220b. The random number generator 100b may output a first random number RN1 to the random operand generator 210b. The random operand generator 210b may generate a first random operand ROa using the first random number RN1, and the output data generator 220b may use the first random operand ROa in an operation on at least sonic of the second input data ID2.

The random number generator 100b may output to the random operand generator 210b a second random number RN2 that is different from the first random number RN1 in the operation on the second input data ID2. For example, the random number generator 100b may update an output signal in the operation on the second input data ID2 from the first random number RN1 to the second random number RN2. The random operand generator 210b may generate a first random operand ROa using the second random number RN2, and the output data generator 220b may use the second random operand ROb in an operation on at least some of the second input data ID2.

According to an embodiment of the inventive concept, by updating a random number output from the random number generator 100b during the operation on input data, random characteristics of the first random operand ROa and the second random operand ROb may be further increased, and the first input data ID1 may be effectively protected from the SCA.

Figure 13:
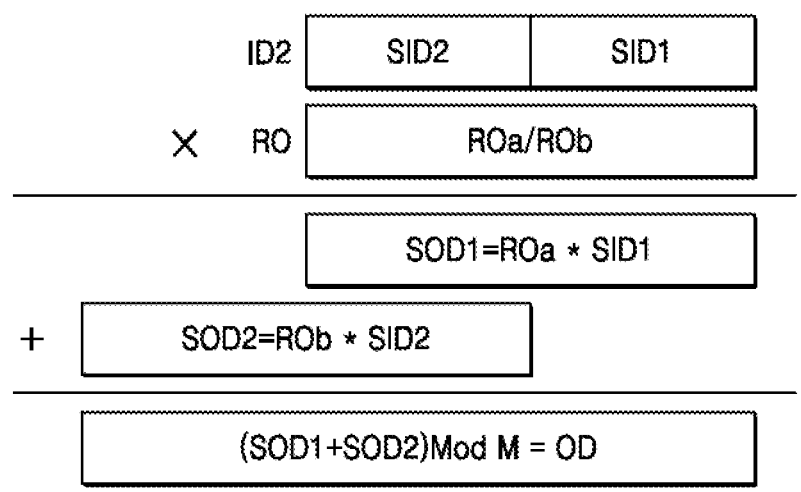
FIG. 13 is a diagram of an operation of a security processor, according to an embodiment.

FIG. 13 is a diagram of an operation of the security processor 10b according to an embodiment.

Referring to FIGS. 12 and 13, the second input data ID2 may include first sub input data SID1 and second sub input data SID2. The random number generator 100b may generate the first random number RN1 and the random operand generator 210b may calculate the first random operand ROa using the first random number RN1. The output data generator 220b may use the first random operand ROa that is generated based on the first random number RN1 in an operation on the first sub input data SID1 among the second input data ID2. For example, the output data generator 220b may generate first sub output data SOD1 by multiplying the first sub input data SID1 by the first random operand ROa.

Next, the random number generator 100*b* may generate the second random number RN2, and the random operand generator 210*b* may calculate the second random operand ROa using the second random number RN2. The output data generator 220*b* may use the second random operand ROb that is generated based on the second random number RN2 in an operation on the second sub input data SID2 among the second input data ID2. In an example, the output data generator 220*b* may generate second sub output data SOD2 by multiplying the second sub input data SID2 by the second random operand ROb.

The output data generator 220*b* may generate, as the output data OD, a remainder value that is obtained by adding the generated first sub output data SOD1 and the second sub output data SOD2 according to the number of digits and dividing a result thereof by the modulo M. In an example, the output data generator 220*b* may add the first sub output data SOD1 and a result that is obtained by matching the least significant bit of the second sub output data SOD2 to the least significant bit of the second sub input data SID2.

Figure 14:
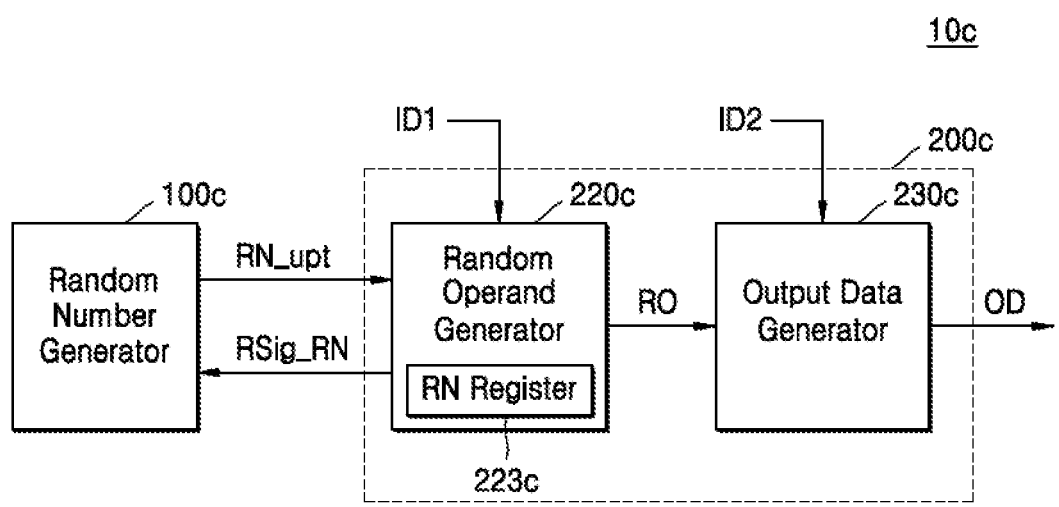
FIG. 14 is a block diagram illustrating a security processor according to an example embodiment.

FIG. 14 is a block diagram illustrating a security processor 10*c* according to an example embodiment The security processor 10*c* may be similar to the security processor 10 described with reference to FIG. 2, except that the security processor 10*c* may include a random number register within the random operand generator. Descriptions previously given with reference to FIG. 2 are omitted.

Referring to FIG. 14, the security processor 10*c* may include a random number generator 100*c* and a modular calculator 200*c*. The modular calculator 200*c* may include a random operand generator 220*c* and an output data generator 230*c*. The random operand generator 220*c* may include a random number register 223*c* for storing a random number.

The random operand generator 220*c* may output a random number request signal RSig_RN to the random number generator 100*c*. The random number generator 100*c* may store an updated random number RN upt, which is updated in response to the random number request signal RSig_RN, in the random number register 223*c*.

In an embodiment, when a certain event occurs, the random operand generator 220*c* may output the random number request signal RSig_RN to the random number generator 100*c*, In an embodiment, the certain event may be when recoding for the input data has been completed. In another embodiment, the certain event may be when recoding for a certain number of bits has been completed.

In another embodiment, the random operand generator 220*c* may output the random number request signal RSig_RN to the random number generator 100*c* when a time point of a certain event has passed.

Figure 15:
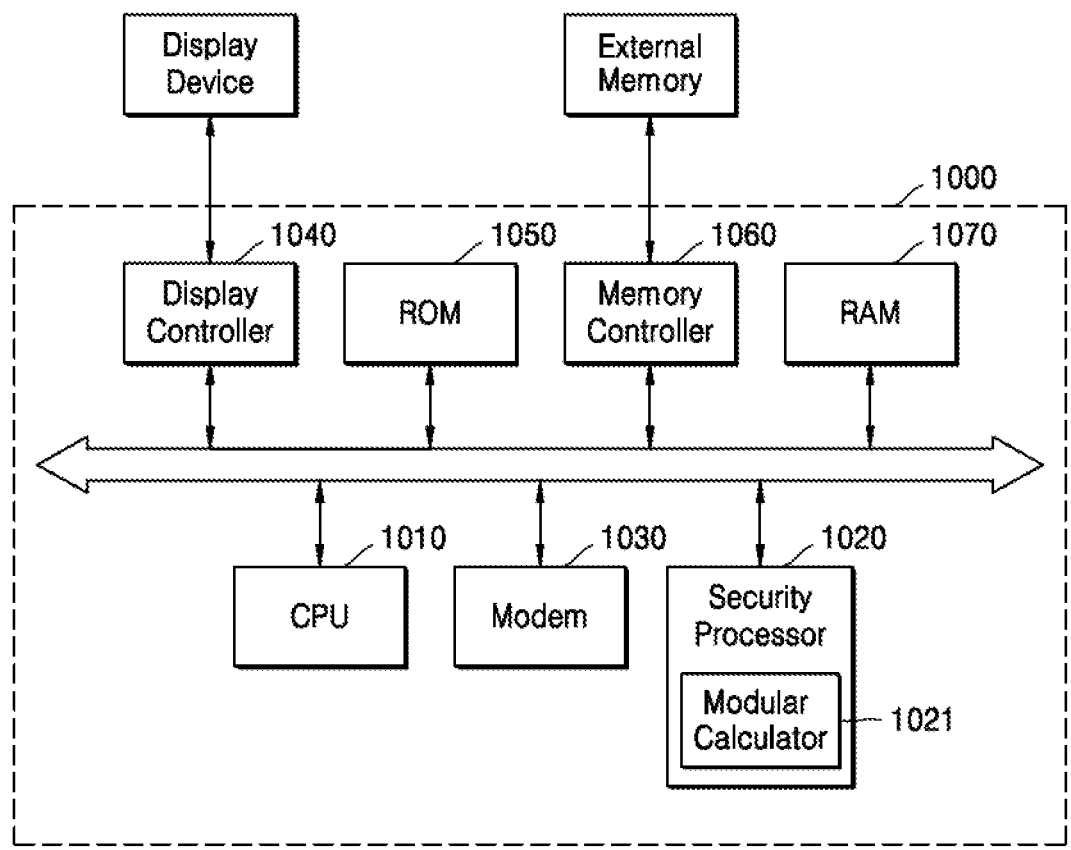
FIG. 15 is a block diagram illustrating an application processor according to an example embodiment.

FIG. 15 is a block diagram illustrating an application processor 1000 according to an example embodiment.

Referring to FIG. 15, the application processor 1000 may be implemented as a system-on-a-chip (SoC). The application processor 1000 may include a central processing unit (CPU) 1010, a security processor 1020, a modem 1030, a display controller 1040, read-only memory (ROM) 1050, a memory controller 1060, and RAM 1070. The application processor 1000 may further include, in addition to the illustrated components, other components such as a power management unit, a graphics processing unit (GPU), and a clock unit.

The CPU 1010 may process or execute programs or data stored in the ROM 1050 and/or the RAM 1070. The ROM 1050 may store programs and/or data. In addition, the RAM 1070 may temporarily store programs, data, and instructions. The memory controller 1060 may perform interfacing with an external memory device, and may read or write data by controlling, the external memory device according to a data access request. In addition, the display controller 1040 may control a display operation of a screen by driving a display device.

According to an embodiment of the inventive concept, the security processor 1020 may perform security operations as described herein. In an embodiment, the security processor 1020 may include a modular calculator 1021 and may perform remainder operations using a random number. Although not illustrated in FIG. 15, the security processor 1020 may further include a random number generator, etc.

As the modem 1030 is provided in the application processor 1000, the application processor 1000 may be referred to as a modem. application processor (ModAP). Information requiring security computation through the modem 1030 may be transmitted/received to!from an external system. At this time, the security processor 1020 may perform the security computation according to the above-described embodiments.

As described above, embodiments have been disclosed in the drawings and the specification. While the embodiments have been described herein with reference to specific terms, it should be understood that they have been used only for the purpose of describing the technical idea of the inventive concept and not for limiting the scope of the inventive concept as defined in the claims. Thus, those with ordinary skill in the art will appreciate that various modifications and equivalent embodiments are possible without departing from the scope of the inventive concept. Therefore, the true scope of protection of the inventive concept should be determined by the technical idea of the appended claims.

What is claimed is:

1. A security processor comprising:
a random number generator configured to generate a first random number; and
a modular calculator configured to receive first input data and second input data, generate a first random operand based on the first input data and the first random number, and generate output data through a remainder operation on the first random operand,
wherein a result value of the remainder operation on the first input data is identical to a result value of the remainder operation on the first random operand for any value of the first input data,
wherein the modular calculator comprises: a first random operand generator configured to generate the first random operand; and an output data generator configured to generate the output data by performing the remainder operation after performing an arithmetic operation on the second input data and the first random operand, and
wherein the random number generator is configured to further generate a second random number, and wherein the modular calculator further comprises a second random operand generator configured to generate a second random operand based on the second input data and the second random number, and wherein the output data generator is configured to generate the output data by performing a remainder operation after performing the arithmetic operation on the first random operand and the second random operand.

2. The security processor of claim 1, wherein the first random operand generator comprises: a multiplier configured to multiply a modulo, which is a divisor of the remainder operation, by the first random number; and an adder configured to generate the first random operand by adding the first input data and a multiplication result of the multiplier.

3. The security processor of claim 2, wherein the multiplier comprises: a recoder configured to generate a plurality of control signals respectively corresponding to a plurality of unit random numbers constituting the first random number; and a unit modulo generator configured to generate a plurality of unit modulos corresponding to values obtained by multiplying the modulo and the plurality of unit random numbers based on the plurality of control signals, wherein the adder is configured to generate the first random operand by adding the plurality of unit modulos and the first input data according to a number of digits.

4. The security processor of claim 3, wherein the recoder is configured to convert each of the plurality of unit random numbers into a plurality of recoding values and generate the plurality of control signals based on the plurality of recoding values.

5. The security processor of claim 4, wherein the recoder comprises a recoding table which stores conversion information for converting the plurality of unit random numbers into the plurality of recoding values based on Booth recoding, and a control signal table which stores conversion information for the plurality of control signals respectively corresponding to the plurality of recoding values, wherein the recoder is configured to convert the plurality of unit random numbers into the plurality of recoding values based on the recoding table and output to the unit modulo generator the plurality of control signals for each of the plurality of recoding values based on the control signal table, and wherein the unit modulo generator is configured to generate the plurality of unit modulos based on the plurality of control signals.

6. The security processor of claim 3, further comprising a memory storing original data including the first input data, wherein the modular calculator is configured to sequentially load a plurality of pieces of divided data obtained by dividing the original data by units of m bits, where m is a natural number.

7. The security processor of claim 6, wherein the adder is configured to perform a second operation on second divided data before performing a first operation on first divided data among the plurality of pieces of divided data, wherein the first random operand generator further comprises a first register for storing a roundup value exceeding m bits in the second operation, and wherein the adder is configured to generate the first random operand by adding the roundup value loaded from the first register, the plurality of unit modulos, and the first divided data according to a number of digits.

8. The security processor of claim 1, wherein the random number generator is further configured to generate a third random number different from the first random number, and the first random operand generator is further configured to generate a third random operand based on the first input data and the third random number in an operation process for the second input data.

9. The security processor of claim 8, wherein the second input data comprises first sub input data and second sub input data, and wherein the output data generator is configured to generate first sub output data by performing the remainder operation after performing the arithmetic operation for the first random operand and the first sub input data, generate second sub output data by performing the remainder operation after performing the arithmetic operation on the third random operand and a third sub input data, and generate the output data by performing the remainder operation after adding the first sub output data and the second sub output data.

10. The security processor of claim 8, wherein the first random operand generator further comprises a second register storing at least one random number received from the random number generator, and wherein the first random operand generator is configured to output a random number request signal to the random number generator after outputting the first random operand to the output data generator, and wherein the random number generator is configured to output the third random number to a first register in response to the random number request signal.

11. A security processor comprising:
a random number generator configured to generate a first random number;
a modular calculator configured to receive first input data and second input data, generate output data by multiplying a modulo by the first random number, and adding the first input data to a multiplication result to generate a first random operand, and then performing a remainder operation on the first random operand in which the first random operand is divided by the modulo,
wherein the modular calculator is configured to perform an arithmetic operation on the second input data and the first random operand and output a remainder, resulting from dividing a result of the arithmetic operation by the modulo, as the output data, and
wherein the random number generator is configured to further generate a second random number different from the first random number, and the modular calculator is configured to further generate a second random operand by multiplying the modulo by the second random number in an operation process for the second input data, and then adding the multiplied modulo and the first input data.

12. The security processor of claim 11, wherein the random number generator is further configured to generate a third random number, and the modular calculator is configured to multiply the modulo by the third random number, generate a third random operand by adding the multiplied modulo and the second input data, perform the arithmetic operation on the first random operand and the third random operand, and generate a remainder, generated as a result of dividing a result of the arithmetic operation by the modulo, as the output data.

13. The security processor of claim 11, wherein the second input data comprises first sub input data and second sub input data, and wherein the modular calculator is configured to perform a first arithmetic operation on the first random operand and the first sub input data, generate first sub output data by dividing a result value of the first arithmetic operation by the modulo, perform a second arithmetic operation on the second random operand and the second sub input data, generate second sub output data by dividing a result value of the second arithmetic operation by the modulo, and generate the output data based on the first sub output data and the second sub output data.

14. The security processor of claim 11, wherein the modular calculator is configured to generate a plurality of control signals corresponding to the first random number based on Booth recoding for the first random number, and to generate a plurality of unit modulos corresponding to a result value of multiplying the first random number by the modulo based on the plurality of control signals.

15. The security processor of claim 14, wherein the modular calculator is configured to generate the first random operand by adding the plurality of unit modulos and the first input data according to a number of digits.

* * * * *